US012601203B2

(12) United States Patent
Promutico et al.

(10) Patent No.: US 12,601,203 B2
(45) Date of Patent: Apr. 14, 2026

(54) HOUSEHOLD APPLIANCE WITH EMERGENCY OPENING AND EMERGENCY OPENING DEVICE

(71) Applicant: Elbi International S.p.A., Turin (IT)

(72) Inventors: Fabrizio Promutico, Turin (IT); Felice Paglia, Turin (IT)

(73) Assignee: Elbi International S.p.A., Turin (IT)

( * ) Notice: Subject to any disclaimer, the term of this patent is extended or adjusted under 35 U.S.C. 154(b) by 0 days.

(21) Appl. No.: 18/652,941

(22) Filed: May 2, 2024

(65) Prior Publication Data

US 2024/0368921 A1 Nov. 7, 2024

(30) Foreign Application Priority Data

May 3, 2023 (IT) ........................ 102023000008640

(51) Int. Cl.
*E05B 63/00* (2006.01)
*D06F 39/14* (2006.01)
*E05B 65/00* (2006.01)

(52) U.S. Cl.
CPC .......... *E05B 63/0069* (2013.01); *D06F 39/14* (2013.01); *E05B 65/00* (2013.01)

(58) Field of Classification Search
CPC .. E05B 63/0069; E05B 63/0052; E05B 65/00; E05B 65/5215; E05B 65/523; E05B 1/00; E05B 1/0038; E05B 1/0046; D06F 39/14; D06F 37/10; D06F 37/18; D06F 37/28; E05C 1/00; E05C 1/04; E05C 1/004
See application file for complete search history.

(56) References Cited

FOREIGN PATENT DOCUMENTS

| | | | | |
|---|---|---|---|---|
| CN | 107142679 | | 9/2017 | |
| CN | 107142679 A | * | 9/2017 | ............. D06F 37/42 |
| CN | 109209026 A | * | 1/2019 | ............. D06F 37/42 |
| EP | 1972714 A1 | * | 9/2008 | ......... E05B 47/0603 |
| EP | 2251479 | | 11/2010 | |
| EP | 1972714 | | 5/2016 | |

(Continued)

OTHER PUBLICATIONS

Machine translation and numbered paragraphs of CN 107142679 A (Year: 2017).*

(Continued)

*Primary Examiner* — Christine M Mills
*Assistant Examiner* — Christopher F Callahan

(57) ABSTRACT

The present invention concerns a household appliance, such as a washing machine (1) and the like, comprising a chassis (2), a door (12) hinged to said chassis (11) for closing an opening (130), and at least one door-lock device (2), close to said door (12) to lock said door (12) closed, and comprising a reset lever (23) configured to unlock said door-lock device (2) to release said door when it is blocked closed. Said household appliance comprises an emergency device (3) comprising an unlocking member (31), wherein said unlocking member (31) comprises an actuation relief (314), accessible from the outside of the chassis (11) of the household appliance (1), and an unlocking relief (313) arranged so as to actuate said reset lever (23) to unlock said door-lock device (2).

The present invention also concerns an emergency device (3).

12 Claims, 6 Drawing Sheets

(56) References Cited

FOREIGN PATENT DOCUMENTS

| | | |
|---|---|---|
| WO | WO 2013/001556 | 1/2013 |

OTHER PUBLICATIONS

Machine translation and numbered paragraphs of CN 109209026 A (Year: 2019).*

Rapporto di Ricerca e l'Opinione Scritta [Search Report and the Written Opinion] Dated Nov. 7, 2023 From the Ministero Delle Imprese e Del Made in Italy, Direzione Generale Sviluppo Produttivo e Competititvita, Ufficio Italiano Brevetti e Marchi Re. Application No. IT202300008640. (10 Pages).

* cited by examiner

HOUSEHOLD APPLIANCE WITH EMERGENCY OPENING AND EMERGENCY OPENING DEVICE

RELATED APPLICATION

This application claims the benefit of priority of Italy Patent Application No. 102023000008640 filed on May 3, 2023, the contents of which are incorporated by reference as if fully set forth herein in their entirety.

The present invention concerns a household appliance with emergency opening and emergency opening device.

FIELD AND BACKGROUND OF THE INVENTION

More in detail, the invention concerns a device of the type mentioned above, applicable for example to a washing machine, designed and realized in particular to allow the opening of a household appliance even in case of a power failure or blackout.

In the following, the description will be directed to the application of the device to a washing machine, but it is clear that it should not be considered limited to this specific use.

As is well known, some models of washing machines currently have a door-lock device activated by a solenoid; in the event of a power failure during normal operation, the end user is unable to open the washing machine door.

To overcome this problem, most washing machines have an emergency cord that forces the door-lock device to open mechanically. In particular, referring to FIGS. 1 and 2, a washing machine is observed, having a chassis 11, in which, in the front part, an opening 13 is made, for access to the drum (not visible in the figure), contained within for the introduction of the clothes to be washed. The washing machine 1 also comprises a door 12 for closing the opening.

As can be seen, the cord is usually activated by accessing the lower part of the machine through a small door to close the access 14. The cord is connected at one end to the door-lock device 2, such that by acting on said cord through the opening 13, it is possible to unlock the door-lock device and open the door 12.

A further solution according to the prior art is that described by our patent no. EP2251479.

The solutions according to the prior art require the creation of specific openings on the panel.

It is clear that this procedure is expensive in economic terms, requiring specific designs.

SUMMARY OF THE INVENTION

In light of the above, it is, therefore, the aim of the present invention to not require openings on the washing machine panel and large cords.

Another purpose of the invention is to be simple to implement.

It is, therefore, specific object of the present invention a household appliance, such as a washing machine and the like, comprising a chassis, a door hinged to said chassis for closing an opening, and at least one door-lock device, close to said door to lock said door closed, and comprising a reset lever configured to unlock said door-lock device to release said door when it is blocked closed, characterized in that it comprises an emergency device comprising an unlocking member, wherein said unlocking member comprises an actuation relief, accessible from the outside of the chassis of the household appliance, and an unlocking relief arranged so as to actuate said reset lever to unlock said door-lock device.

Always according to the invention, said unlocking member may have a seat and comprises a return spring arranged in said seat, wherein said return spring is arranged so as to return said unlocking member to its initial position after the actuation.

Still according to the invention, said unlocking member may comprise a main portion, and two ends, on each of which a unlocking relief is provided.

Still according to the invention, said seat may be obtained in said main portion.

Advantageously according to the invention, said unlocking member may be arranged in correspondence with or above the door-lock device.

Preferably according to the invention, said emergency device may comprise a base for supporting said unlocking member, which can be fixed to said chassis, wherein said base has a lateral guide indentation, for guiding said actuation relief.

Further according to the invention, said door-lock device may comprise a rotating hook, interacting with said door when it is closed, and a slider, interacting with said rotating hook, wherein said slider is capable of assuming a release position, wherein it does not interfere with the rotating hook, so that the door can be opened, and a blocked position, wherein interferes with said rotating hook, so that said rotating hook engages with the door, to keep the door closed, and said reset lever, when actuated, may interact with said slider to force it to pass from said blocked position to said release position and unlock the door when said actuation relief is operated to translate said unlocking member.

Always according to the invention, said door may include a prong, said door-lock device may have an inlet opening wherein said prong can be inserted, wherein when said prong is introduced into said inlet opening, said prong interacts with said slider, and wherein said prong engages with said rotating hook when assuming said blocked position, and said base for supporting said unlocking member may be fixed to said chassis and has a slot, overlapped on said opening of said door-lock device.

Still according to the invention, said chassis may have one or more housings, arranged close to said door when it is in said closed position, wherein in each of said housings a door-lock can be arranged.

Further according to the invention, said chassis may have at least one passage opening, through which a respective unlocking relief interferes with said slider of said door-lock device.

It is also object of the present an emergency device applicable to a door-lock device of the type comprising a slider, capable of assuming a release position, wherein it does not interfere with a door of a household appliance, so that the door can be opened, and a blocked position, wherein it interferes or engages with the door, to hold the door closed, wherein said emergency device comprises a unlocking member, comprising an actuation relief, and an unlocking relief arranged to interact with the slider to force it to pass from said blocked position to said release position and unlock the door when said actuation relief is actuated for translating said unlocking member.

Always according to the invention, said unlocking member may have a seat and comprises a return spring arranged in said seat, wherein said return spring is arranged so as to return said unlocking member to its initial position after actuation.

Still according to the invention, said unlocking member may comprises a main portion, and two ends, on each of which a release relief is provided.

Advantageously according to the invention, said device may comprise a base for supporting said unlocking member, which can be fixed to said household appliance, wherein said base has an indentation lateral guide, for guiding said actuation relief.

BRIEF DESCRIPTION OF THE SEVERAL VIEWS OF THE DRAWINGS

The present invention will be now described, for illustrative but not limitative purposes, according to its preferred embodiments, with particular reference to the figures of the enclosed drawings, wherein.

DESCRIPTION OF SPECIFIC EMBODIMENTS OF THE INVENTION

In the various figures the similar parts will be indicated with the same numerical references.

Figure 1:
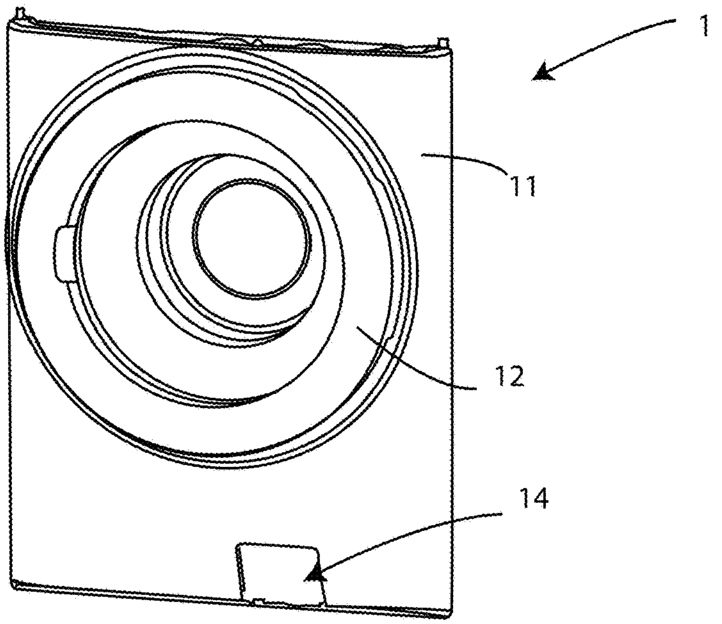
Fig. 1 (Prior Art)
FIG. 1 shows a front view of a washing machine according to the prior art.
Figure 2:
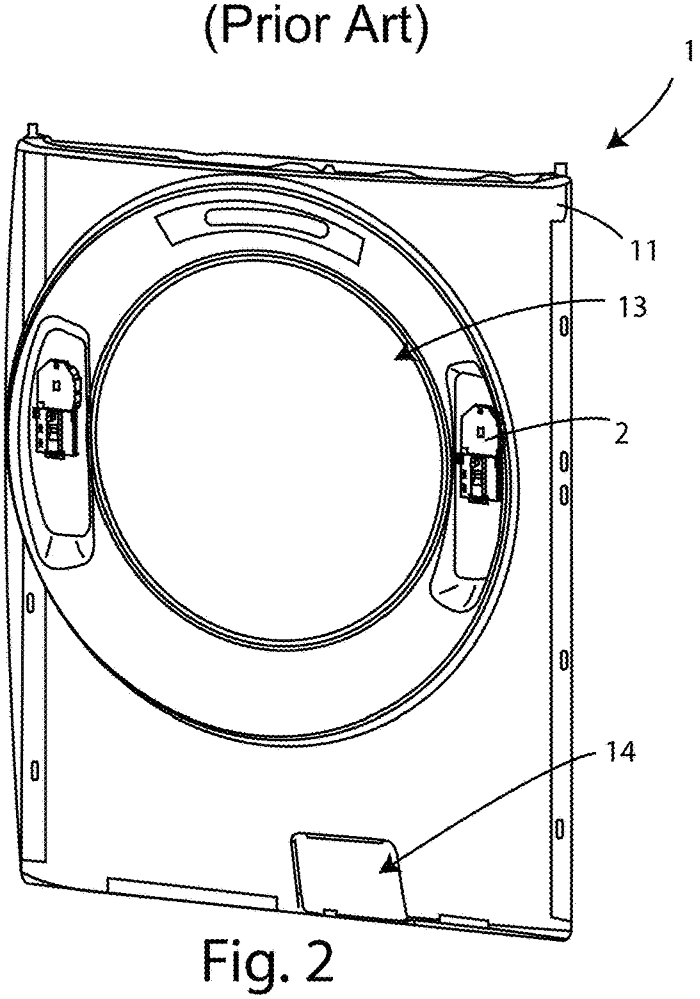
Fig. 2 (Prior Art)
FIG. 2 shows a portion of the washing machine of FIG. 1.
Figure 3:
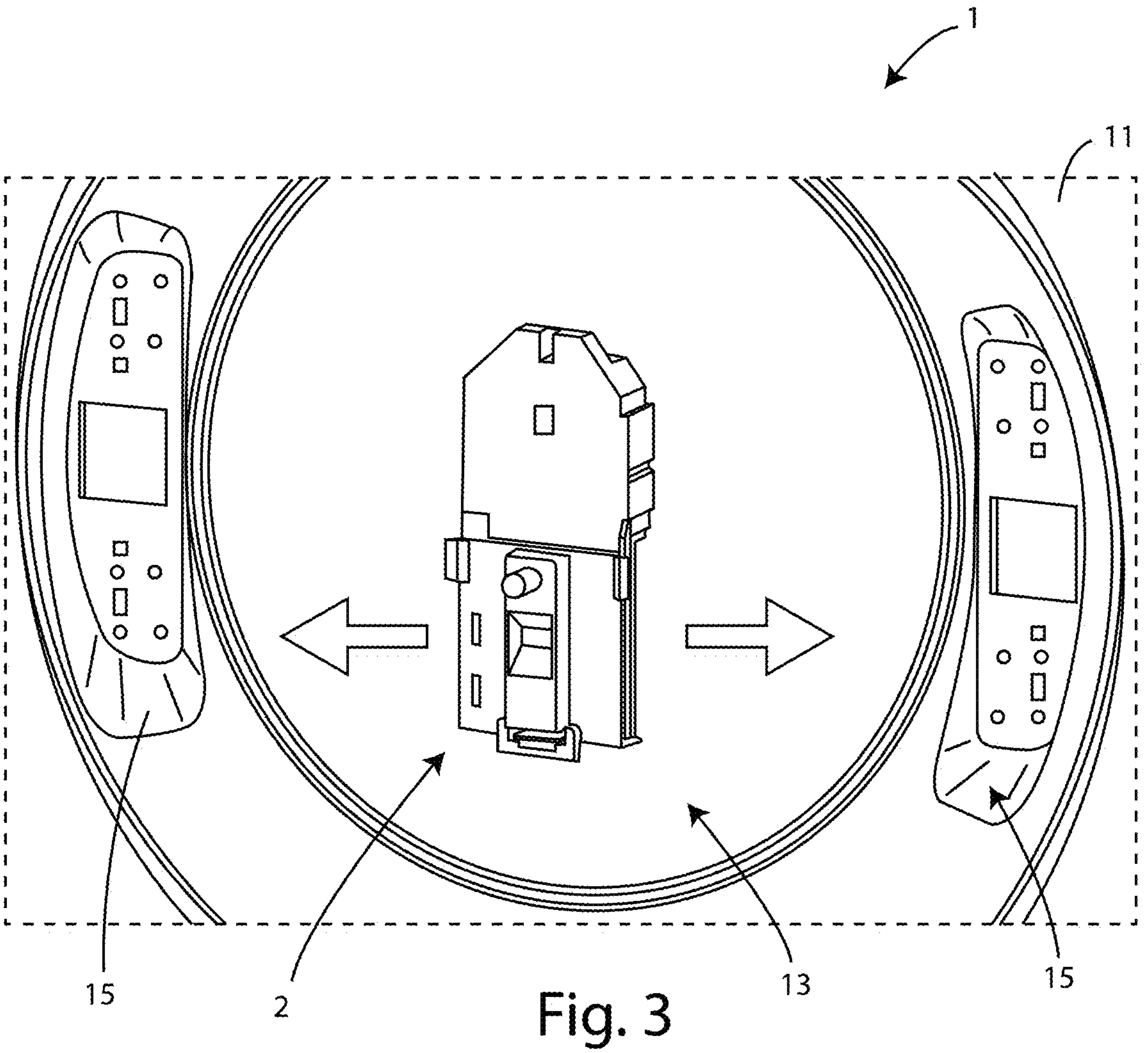
FIG. 3 shows the installation options of a door-lock device.
Figure 4:
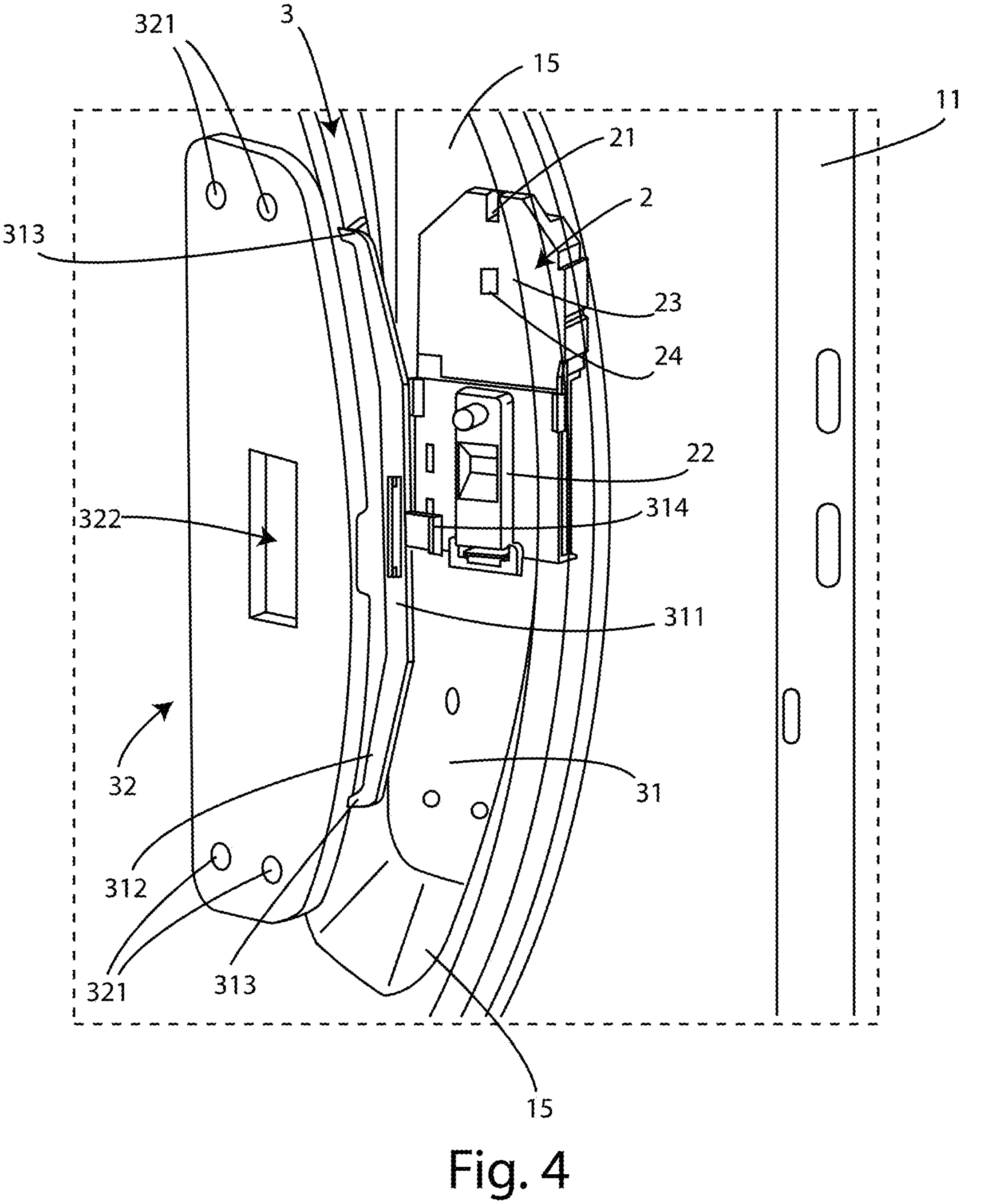
FIG. 4 shows an exploded view of one embodiment of an emergency device with respect to a door-lock device according to the present invention.
Figure 5:
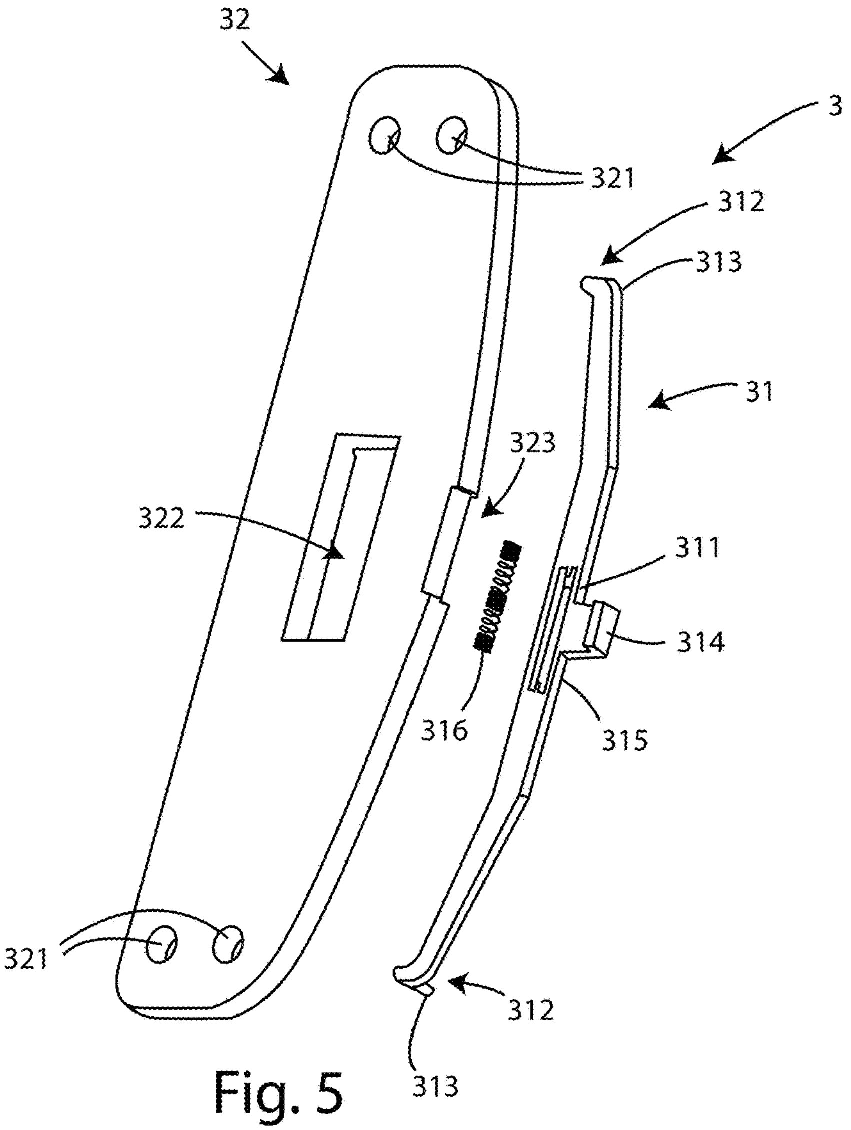
FIG. 5 shows an exploded view of the emergency device according to FIG. 4.

Referring to FIGS. 3-5, a washing machine 1 is observed having a door-lock device 2, and an emergency device 3 of the door-lock device 2. The door-lock device 2 and the emergency device 3 can be applied in general to any type of household appliance, not just a washing machine, equipped with a closing door.

The washing machine 1 always comprises a chassis 11, on which an opening 13 is made for access to a drum (not shown in the figures).

The washing machine 1 also comprises a door 12 for closing the opening 13. The door 12 is hinged to the chassis 11. The washing machine 1 also comprises a pair of door-lock devices 2, arranged near the perimeter of the opening 13, reciprocally arranged in a diametrically opposite position, to keep the door 12 closed when it is in closed conditions. In other embodiments, the washing machine 1 may comprise a single door-lock device 2.

On the chassis 11 of the washing machine 1 there is one or more slots 15 for housing and fixing a respective door-lock device 2.

Each door-lock device 2 comprises a slider 21 and has an inlet opening 22. A prong (not shown in the figure) integral with the door 12 is intended to be inserted into the inlet opening 22. When the prong is introduced into the inlet opening 22, said prong interacts with a hook, generally a rotating hook (not shown in the figures), which in turn interacts with the slider 21, so that the latter can assume, following an appropriate command, a release position, in which it does not interfere with the door 12, and in particular with the nose piece integral with the door, so that the door can be opened, and a blocking position, in which it interferes or engages with the door 12, and in particular with the rotating hook, which in turn holds the prong to keep the door closed. Generally, the door-lock 2 also comprises a locking pin (not shown in the figures), which locks the slider 21 in position.

Furthermore, the door-lock device 2 also comprises a reset lever 23, arranged in correspondence with a reset opening 24. The reset lever 23, when activated, allows the mechanical, forced, and immediate unlocking of the door-lock device 2, disabling the locking<and allowing the rotating hook to rotate if the door is opened.

The emergency device 3 comprises an unlocking member 31 and a base 32. The unlocking member 31 has an elongated shape and, in the present embodiment, slightly curved. The unlocking member 31 is arranged at or above the door-lock device 2 and has a main portion 311 and two ends 312, on each of which there is an unlocking relief 313, which interacts when said unlocking member 31 is installed, with the reset lever through the reset opening 24. In some embodiments, the unlocking member 31 has only one unlocking relief 313. The release member 31 comprises in the main portion 311 an actuation relief 314, the function of which will be better described below.

The unlocking member 31 also has a seat 315, positioned in the main portion 311, in which a return spring 316 is located, for recalling the emergency device 3 into position when it is activated. In other embodiments, the spring 16 can be replaced by a specific design of the unlocking member 31 with elastic appendices performing the same function as the return spring 316.

The base 32 is plate-shaped and has the function of supporting the unlocking member 31. The base 32 has fixing holes 321 for fastening to the chassis 11 of the washing machine 11 and a slot 322, which overlaps, when the emergency device is installed at opening 22 of the door-lock device 2.

The base 32 also has a lateral guide indentation 323, into which the actuation relief 314 is placed, so that it can be accessible from the outside.

The operation of the emergency device 3 described above is as follows.

Figure 6:
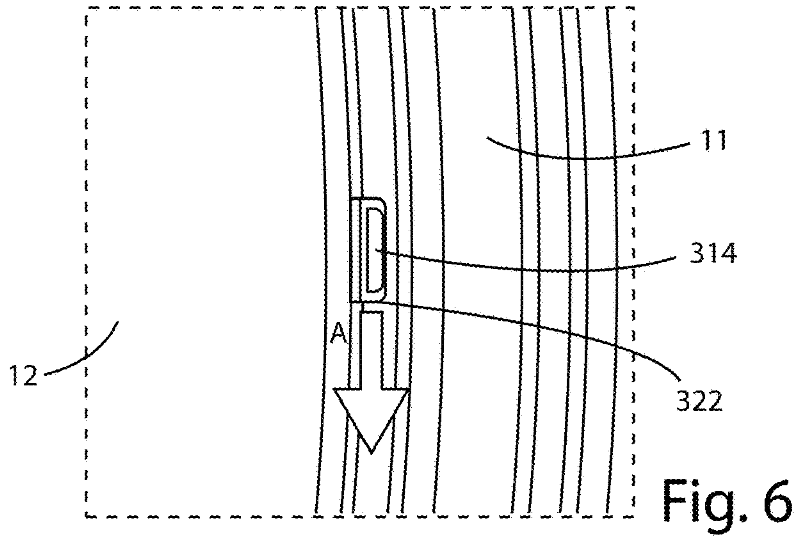
FIG. 6 shows the activation of the emergency device according to FIG. 4 in the event of a blackout.
Figure 7:
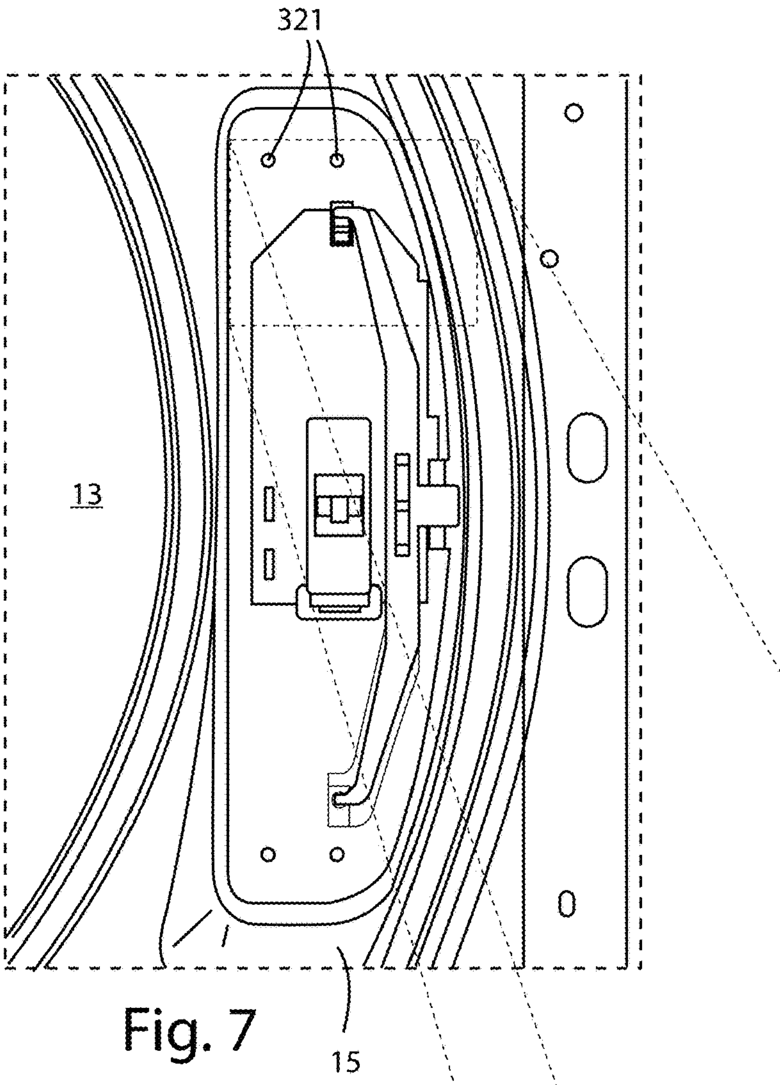
FIG. 7 shows the operation of the emergency device for opening a door of a household appliance.
Figure 8:
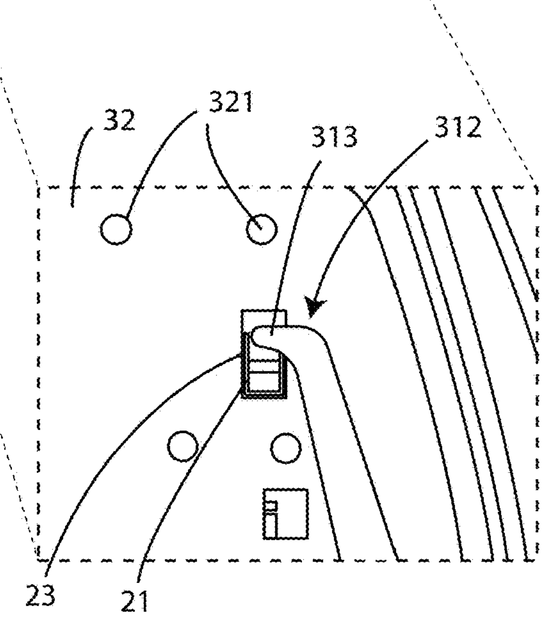
FIG. 8 shows a detail of FIG. 7.

Also referring to FIGS. 6-8, in case of the door 12 of the washing machine 1 is closed and the door-lock device 2 is in the door-locking position, i.e., the slider 21 is in such a position as to be engaged with the door 12 to hold it closed.

If a blackout were to occur, it would not be possible to open the door 12. In this case, referring to FIG. 6, acting on the actuation relief 314 in the direction of arrow A, in which it is forced to slide thanks to the lateral guide indent 323 of the base 32, the unlocking relief 313 interacts with the reset lever 23 through the reset opening 24, forcing the unlocking of the door-lock device 2 and allowing the slider 21 to pass from said blocked position to said release position, always sliding it towards arrow A, thus allowing, in the event of a door opening by a user, to disengage the door 12 and allow the opening of the door 12.

After activating the unlocking member 31, the return spring 316 returns the unlocking member 31 itself to the initial position.

Figure 9:
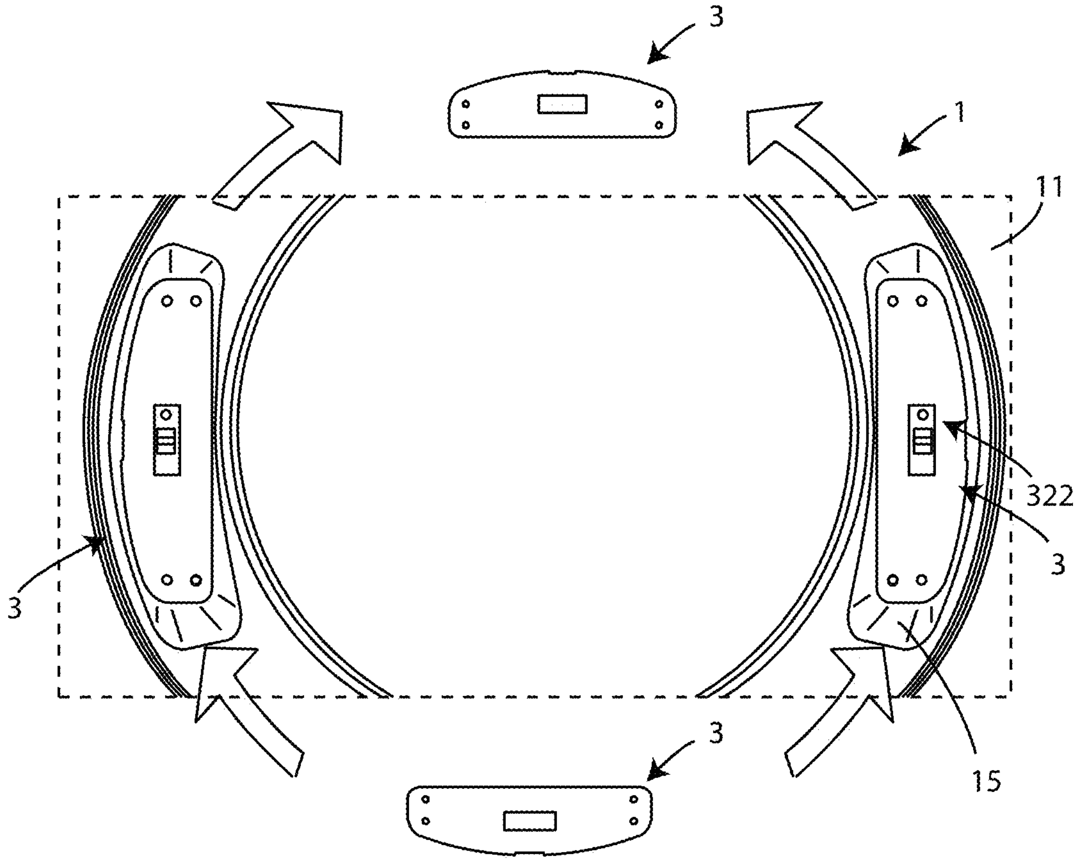
FIG. 9 schematically shows the installation methods of the emergency device according to the present invention.

Finally, with reference to FIG. 9, it can be seen how the emergency device 3 in the described embodiment can be installed in different points of the chassis 11 always in proximity to the door 12, thus making it particularly flexible.

ADVANTAGES

An advantage of the emergency device according to the present invention is that it allows the emergency opening of a door in the event of a blackout without having to make significant modifications to the chassis of the washing machine or the household appliance in general.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. A household appliance, comprising:

a chassis;

a door hinged to said chassis for closing an opening;

at least one door-lock device, close to said door to lock said door closed, and comprising a reset lever configured to unlock said door-lock device to release said door when it is blocked closed; and an emergency device comprising an unlocking member having:

an actuation relief, accessible from the outside of the chassis of the household appliance, and an unlocking relief arranged so as to actuate said reset lever to unlock said door-lock device;

wherein said unlocking member has a seat and comprises a return spring arranged in said seat, wherein said return spring is arranged so as to return said unlocking member to its initial position after the actuation.

2. The household appliance according to claim 1, wherein said unlocking member comprises: a main portion; and an end on which an unlocking relief is provided.

3. The household appliance according to claim 1, wherein said seat is obtained in said main portion.

4. The household appliance according to claim 1, wherein said unlocking member is arranged in correspondence with or above the door-lock device.

5. The household appliance according to claim 1, wherein said emergency device comprises a base for supporting said unlocking member, which is fixed to said chassis, wherein said base has a lateral guide indentation for guiding said actuation relief.

6. The household appliance according to claim 1, wherein said door-lock device comprises:

a slider, adapted for interacting with a rotating hook, wherein said slider is in:

(a) a release position when it does not interfere with the rotating hook to allow the door to be opened, and (b) a blocked position when it interferes with said rotating hook while said rotating hook engages with the door; to keep the door closed, and wherein said reset lever, when actuated, forces said slider to pass from said blocked position to said release position and unlock the door when said actuation relief is operated to translate said unlocking member.

7. The household appliance according to claim 6, wherein said door includes a prong wherein said emergency device comprises a base for supporting said unlocking member; wherein said door-lock device has an inlet opening wherein said prong is inserted;

wherein when said prong is introduced into said inlet opening, said prong interacts with said slider;

wherein said prong engages with said rotating hook when assuming said blocked position; and wherein said base for supporting said unlocking member is fixed to said chassis and has a slot, overlapped on said opening of said door-lock device.

8. The household appliance according to claim 6, wherein said chassis has at least one passage opening, through which a respective unlocking relief interferes with said slider of said door-lock device.

9. The household appliance according to claim 1, wherein said chassis has one or more housings, arranged close to said door when it is in said closed position, wherein in each of said housings a door-lock is arranged.

10. An emergency device applicable to a slider having:

a release position when it does not interfere with a door of a household appliance to allow the door to be opened, and a blocked position when it interferes or engages with the door, to hold the door closed, wherein said emergency device comprises an unlocking member, comprising:

an actuation relief; and an unlocking relief arranged to interact with the slider to force it to pass from said blocked position to said release position and unlock the door when said actuation relief is actuated for translating said unlocking member;

wherein said unlocking member has a seat and comprises a return spring arranged in said seat, wherein said return spring is arranged so as to return said unlocking member to its initial position after actuation.

11. The emergency device according to claim 10, wherein said unlocking member comprises: a main portion; and an end on which a release relief is provided.

12. The emergency device according to claim 10, wherein it comprises a base for supporting said unlocking member, which is fixed to said household appliance, wherein said base has an indentation lateral guide, for guiding said actuation relief.

* * * * *